(12) United States Patent
Tagawa et al.

(10) Patent No.: US 7,492,082 B2
(45) Date of Patent: Feb. 17, 2009

(54) LIGHT SOURCE APPARATUS WITH SEALING PORTION RECEIVING SECTION

(75) Inventors: Yukiharu Tagawa, Hyogo (JP); Yoshio Okazaki, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 506 days.

(21) Appl. No.: 11/242,891

(22) Filed: Oct. 5, 2005

(65) Prior Publication Data

US 2006/0071583 A1    Apr. 6, 2006

(30) Foreign Application Priority Data

Oct. 6, 2004    (JP)    ............... 2004-294114

(51) Int. Cl.
*H01J 5/16* (2006.01)
*H01J 61/40* (2006.01)
*H01K 1/26* (2006.01)
*H01K 1/30* (2006.01)

(52) U.S. Cl. .............. 313/113; 313/634; 313/318.01; 313/623

(58) Field of Classification Search ............... 313/113, 313/634, 623, 625, 238, 318.01
See application file for complete search history.

(56) References Cited

U.S. PATENT DOCUMENTS

2005/0073841 A1*    4/2005    Imamura .................... 362/264

2005/0094406 A1*    5/2005    Okazaki .................... 362/341

FOREIGN PATENT DOCUMENTS

JP    2002-260432 A    9/2002
JP    2003-317658 A    11/2003

\* cited by examiner

*Primary Examiner*—Toan Ton
*Assistant Examiner*—Kevin Quarterman
(74) *Attorney, Agent, or Firm*—Rader, Fishman & Grauer, PLLC

(57) ABSTRACT

It is an object of the present invention to provide a light source apparatus capable of reducing the production cost and increasing productivity. A light source apparatus comprises an approximately spherical discharge container, sealing portions continuously formed from both ends of the discharge container respectively, and a concave reflection mirror disposed so as to surround the discharge lamp, wherein the concave reflection mirror has a spheroidal surface or paraboloid of revolution formed from a front opening edge thereof, a sealing portion receiving section is formed at a head section of the concave reflection mirror and has a flat inner bottom surface, in which an end of one of the sealing portions is received, and an end surface of an end portion of the one of the sealing portions and the inner bottom surface of the sealing portion receiving section are brought into contact.

11 Claims, 3 Drawing Sheets

FIG. 3A
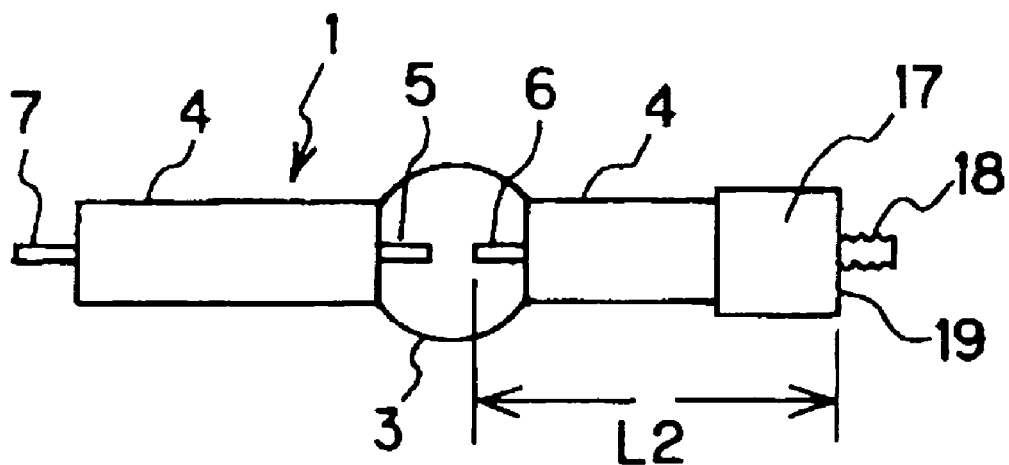
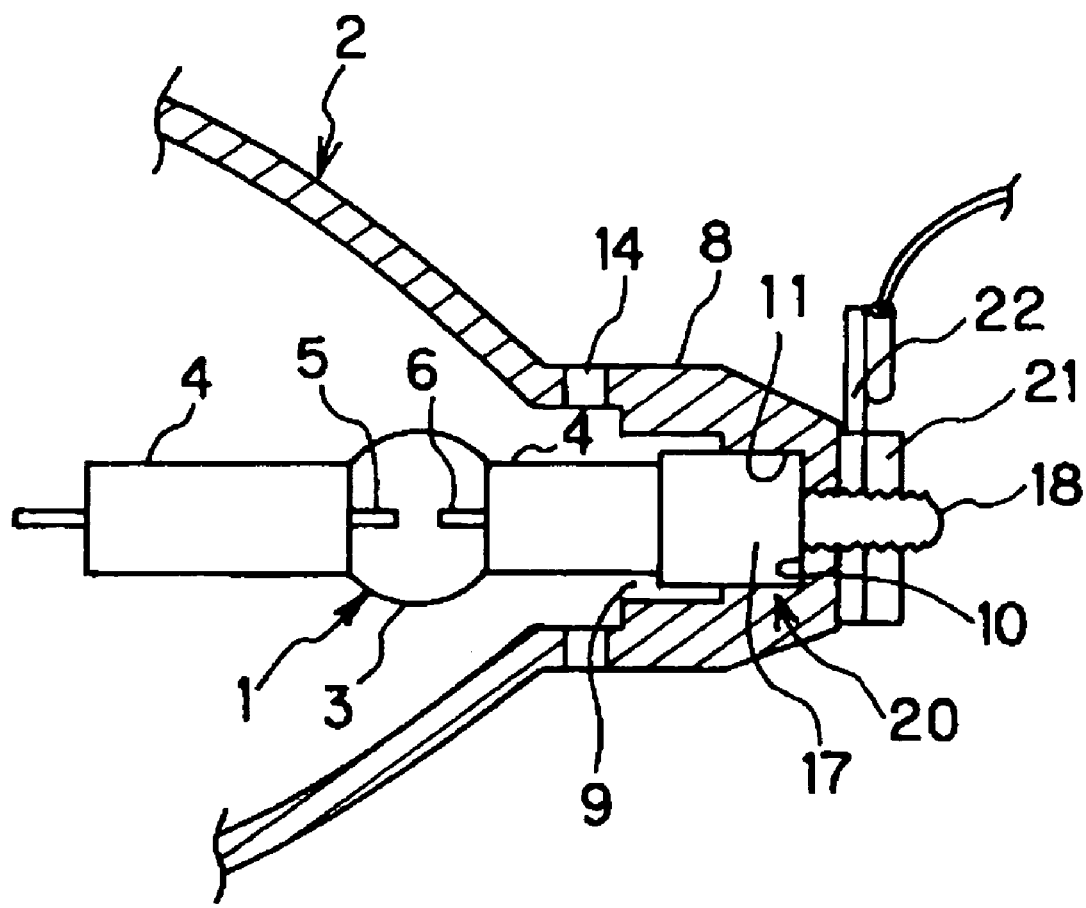
FIG. 3B

LIGHT SOURCE APPARATUS WITH SEALING PORTION RECEIVING SECTION

TECHNICAL FIELD OF THE INVENTION

The present invention relates to a light source apparatus, and specifically to a light source apparatus in which the accuracy of dimension between a discharge lamp and a concave reflection mirror is secured with high precision.

DESCRIPTION OF RELATED ART

For example, a light source apparatus in which a short arc type discharge lamp and a concave reflection mirror are combined is used for a liquid crystal projector. Such a liquid crystal projector is required to have high color rendering properties. As a short arc type discharge lamp, a metal halide lamp in which mercury, rare gas, or metal halide is enclosed in an electric discharge container made of quartz glass on which a pair of electrodes is arranged facing each other, has been used.

In recent years, a mercury discharge lamp having very high mercury vapor pressure, for example, mercury vapor pressure of 20 or more MPa, instead of the metal halide lamp is used.

Moreover, the concave reflection mirror is made of a heat-resistant bolosilicate glass or crystallization glass where higher thermal resistance is required.

FIG. 4 is a schematic view of a light source apparatus disclosed in the Japanese Laid Open Patent No. 2003-317658, wherein the short arc type discharge lamp and the concave reflection mirror are combined.

As shown in the figure, in a short arc type discharge lamp 101, sealing portions 104, 104 are formed connecting to both ends of an electric discharge container 103 made of quartz glass, respectively, and a pair of electrodes 105, 106 is disposed facing each other in an electric discharge container 103. The concave reflection mirror 102 is made of bolosilicate. One of sealing portions 104 of the short arc type discharge lamp 101 penetrates though a head section 107 of the concave reflection mirror 102 and a penetration section 108 thereof, wherein a metal mouthpiece 109 of the sealing portion 104 is fixed to the head section 107 by adhesives 110. A front glass 111 covers the concave reflection mirror 102.

FIG. 5 is a schematic view of a light source apparatus disclosed in the Japanese Laid Open Patent No. 2003-260432, wherein a short arc type discharge lamp and a concave reflection mirror are combined.

As shown in the figure, in the short arc type discharge lamp 112, sealing portions 115, 115 are formed connecting to both ends of an electric discharge container 114 made of quartz glass, respectively, and a pair of electrodes 116, 117 is disposed facing each other in an electric discharge container 114. One of sealing portions 115 of the short arc type discharge lamp 112 penetrates though a penetration section 119 provided in a head section 118 of the concave reflection mirror 113, and the outside of a sealing portion 115 which penetrates through the head section 118 and the penetration section 119 of the concave reflection mirror 113, is fixed with adhesives 121 and 122 to a ceramic base 120 which is a separate component.

However, since in the light source apparatus in which the ceramic base 120 is used, among these light source apparatuses disclosed in these references, the head section 118 of the concave reflection mirror 113 is fixed to the ceramic base 120 with adhesives 121, and one of the sealing portions 115 of the discharge lamp 112 is inserted in the head portion 118 of the concave reflection mirror 113 and then fixed by the ceramic base 120 and the adhesive 122 so that dimensional tolerance is large and the fixing accuracy of the lamp is affected.

Consequently, it was difficult to conform the emission center and the optical axis of the discharge lamp to the focal point and the optical axis the concave reflection mirror, so that the performance of light source apparatus could not be improved.

Moreover, since in the light source apparatus shown in the above-mentioned references, production process thereof is complicated so that time and effort is needed, and since only part of process could be automated, the productivity of the lamp is not good thereby increasing the cost.

SUMMARY OF THE INVENTION

In view of the above problem, it is an object of the present invention to provide a light source apparatus in which productivity thereof is excellent and cost thereof is reduced by conforming the focal point and optical axis of concave reflection mirror to the emission center and the optical axis of a discharge lamp.

In order to solve the problem, a light source apparatus according to the present invention, comprises an approximately spherical discharge container, sealing portions continuously formed from both ends of the discharge container respectively, and a concave reflection mirror disposed so as to surround the discharge lamp, wherein the concave reflection mirror has a spheroidal surface or paraboloid of revolution formed from a front opening edge thereof, a sealing portion receiving section is formed at a head section of the concave reflection mirror and has a flat inner bottom surface, in which an end of one of the sealing portions is received, and an end surface of an end portion of the one of the sealing portions and the inner bottom surface of the sealing portion receiving section are brought into contact.

Also, a light source apparatus according to the present invention comprises an approximately spherical discharge container, sealing portions continuously formed from both ends of the discharge container respectively, and a concave reflection mirror disposed so as to surround the discharge lamp, wherein the concave reflection mirror has a spheroidal surface or paraboloid of revolution formed from a front opening edge thereof, a mouthpiece receiving section is formed at a head section of the concave reflection mirror and has a flat inner bottom surface, in which an end of the mouthpiece is received, an end surface of the mouthpiece and the inner bottom surface of the mouthpiece receiving section are brought into contact.

The discharge lamp may be a direct current discharge lamp, wherein the sealing portion in the electrode side is contained in the sealing portion receiving section or the mouthpiece receiving section.

Since light source apparatus comprises a discharge container, sealing portions continuously formed from both ends of the discharge container respectively, and a concave reflection mirror disposed so as to surround the discharge lamp, wherein the concave reflection mirror has a spheroidal surface or paraboloid of revolution formed from a front opening edge thereof, a sealing portion receiving section is formed at a head section of the concave reflection mirror and has a flat inner bottom surface, in which an end of one of the sealing portions is received, and an end surface of an end portion of the one of the sealing portions and the inner bottom surface of the sealing portion receiving section are brought into contact, it is possible to provide a light source apparatus in which productivity is excellent and cost thereof is reduce.

Since a light source apparatus comprises a discharge container, sealing portions continuously formed from both ends of the discharge container respectively, and a concave reflection mirror disposed so as to surround the discharge lamp, wherein the concave reflection mirror has a spheroidal surface or paraboloid of revolution formed from a front opening edge thereof, a mouthpiece receiving section is formed at a head section of the concave reflection mirror and has a flat inner bottom surface, in which an end of the mouthpiece is received, an end surface of the mouthpiece and the inner bottom surface of the mouthpiece receiving section are brought into contact, it is possible to provide a light source apparatus in which productivity is excellent and cost thereof is reduced.

Since the discharge lamp may be a direct current discharge lamp, wherein the sealing portion in the electrode side is contained in the sealing portion receiving section or the mouthpiece receiving section, it is possible to effectively cool down the sealing portion in the anode side which tends to be high in temperature.

Thus, there are a number of advantages and there is no requirement that a claim be limited to encompass all of objects and the advantages.

In addition, the foregoing has outlined rather broadly the features and technical advantages in order that the detailed description of the invention that follows may be better understood. Additional features and advantages will be described hereinafter which form the subject of the claims.

DESCRIPTION OF THE DRAWINGS

For a more complete understanding, and the advantages thereof, reference is now made to the following description taken in conjunction with the accompanying drawings, in which:

FIGS. 3A and 3B are explanatory diagrams to illustrate a method for fixing a concave reflection mirror and a short arc type discharge lamp to each other in the short arc type lamp apparatus having a metal mouthpiece in a sealing portion;

DETAILED DESCRIPTION OF THE INVENTION

A description will now be given, referring to embodiments thereof. While the claims are not limited to such embodiments, an appreciation of various aspects of the invention is best gained through a discussion of various examples thereof.

Embodiments according to the present invention will be described below, referring to FIGS. 1-3.

Figure 1:
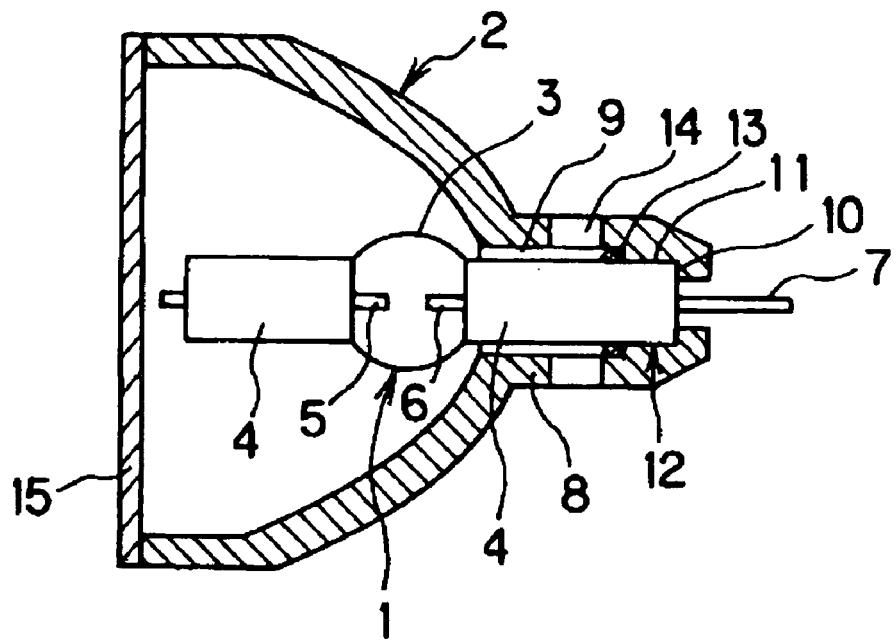
FIG. 1 is a schematic view of a light source apparatus according to an embodiment of the present invention.

FIG. 1 is a schematic view of a light source apparatus according to an embodiment of the present invention.

As shown in this figure, the light source apparatus is structured by combining a short arc type discharge lamp 1 and a concave reflection mirror 2. In the short act discharge lamp 1, sealing portions 4 are formed continuously from both ends of an electric discharge container having an approximately spherical shape and made of quartz glass, and a cathode 5 and an anode 6 are arranged facing each other and external leads 7, 7 are pulled out from the respective ends of the sealing portions 4, 4, wherein the electrodes 5 and 6 are connected to the respective external leads 7, 7. A reflective surface of the concave reflection mirror 2 has a spheroidal surface or paraboloid of revolution formed from a front opening edge. One of the sealing portions 4 of the short arc discharge lamp 1 penetrates through a penetration section 9 provided in a head section 8 of the concave reflection mirror 2. An end portion of the head section 8 of the concave reflection mirror 2 has a flat inner bottom surface 10 and an internal surface 11 having an approximately same diameter as the sealing portion 4. Also, there is a sealing portion receiving section 12 in which an end portion of the sealing portion 4 is received.

Since one of the sealing portions 4 of the short arc type discharge lamp 1 penetrates through the head section 8 of the concave reflection mirror 2, the sealing portion 4 is received in the sealing portion receiving section 12, and an end surface of the end portion of the sealing portion 4 is brought into close contact with the inner bottom surface 10, it is possible to conform the emission center and the optical axis of the short arc discharge lamp 1 to the focal point and the optical axis the concave reflection mirror 2.

After the end portion of the sealing portion 4 of the short arc type discharge lamp 1 is inserted in the sealing portion receiving section 12 of the concave reflection mirror 2, adhesive 13 is filled up between an inner surface of the head section 8 of the concave reflection mirror and the sealing portion 4 of the short arc type discharge lamp 1 from an adhesives filling hole (not shown), thereby fixing the short arc type discharge lamp 1 and the concave reflection mirror 2 to each other. The short arc discharge lamp 1 has ventilating holes 14 and a front glass 15 covering an front opening edge of the concave reflection mirror 2.

In addition, although from viewpoints of thermal resistance, the cost of materials, thermal conductivity, etc., it is desirable that the concave reflection mirror 2 is made of alumina, mullite, steatite, etc., it is possible to produce the concave reflection mirror 2 by the conventional glass formation.

Next, description of a method of forming the concave reflection mirror 2 will be described, below.

When the concave reflection mirror 2 having the integrated structure including the head section 8 and the sealing portion receiving portion 12, is produced from clay, the clay is press fitted in a hygroscopic mold such as a gypsum mold by the slip cast method, thereby making the mold absorb adequate moisture so as to form the concave reflection mirror 2. Then, after the concave reflection mirror 2 which is integrally structured with the sealing portion receiving section 12 is take out of the model, temporary baking is carries out, and then actual (main) baking is carried out. Since the problem of finish surface roughness arises, the actual baking is performed after glaze is applied thereto, or a flat and smooth surface is formed by grinding the rough surface.

Moreover, there is a dry type pressing method as the forming method used for the present invention. In the dry type pressing method, ceramic powder, for example, mullite, or steatite is mixed with binder such as a stearic acid and the granulation thereof is carried out. The granulated material is introduced in a press mold so as to carry out press molding. Then, degreasing is carried out by heating etc. in air and the main baking is performed after glaze is applied thereto.

After forming a flat and smooth surface by the above-mentioned slip cast method or the above-mentioned dry type pressing method, a dielectrics multi-layer film or an aluminum vapor-deposited film is formed on the reflective surface, so as to complete production of the concave reflection mirror 12.

Next, description of a method of fixing the short arc type discharge lamp 1 to the concave reflection mirror 12 will be given below, referring to FIGS. 2A, 2B, 2C, 3A and 3B.

Figure 2A:
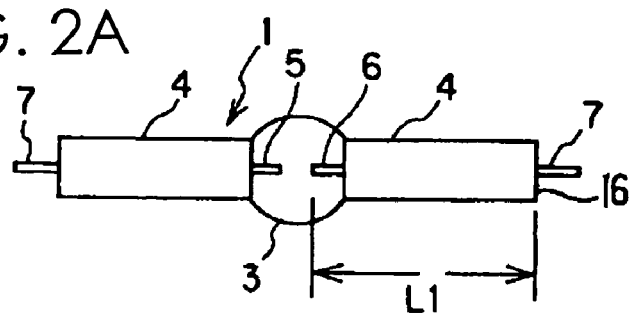
FIGS. 2A, 2B, and 2C are explanatory diagrams to illustrate a method for fixing a concave reflection mirror and a short arc type discharge lamp to each other in the short arc type discharge lamp which does not have metal mouthpiece in a sealing portion.
Figure 2C:
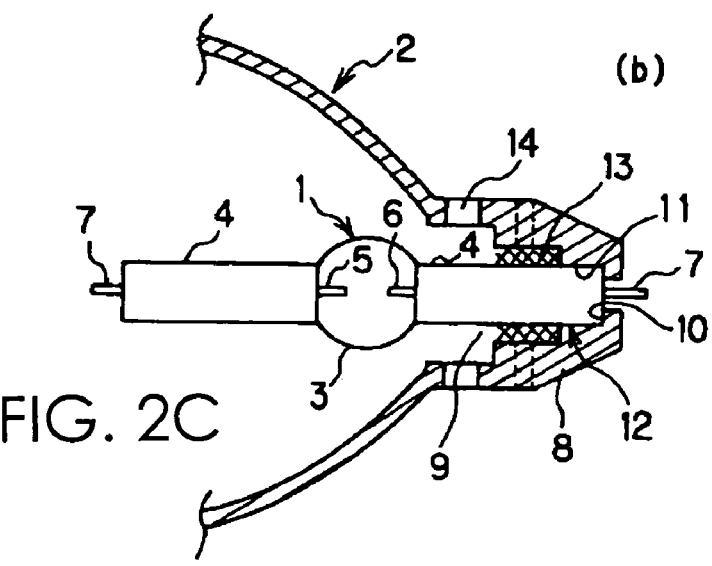
Figure 2B:
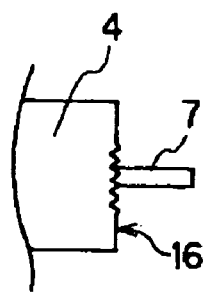
Figure 4:
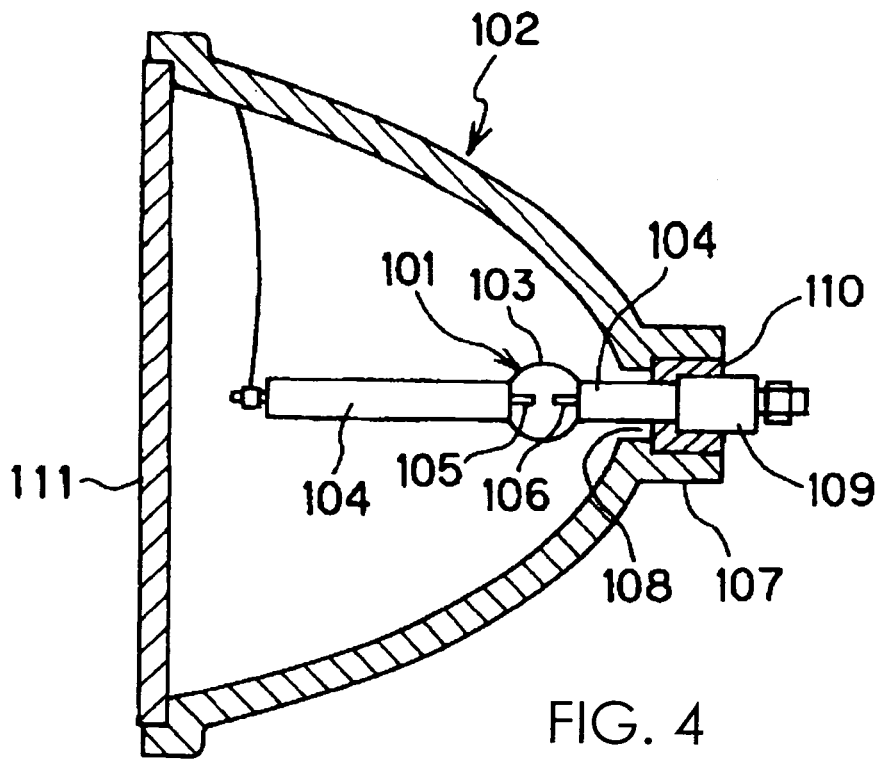
FIG. 4 is a schematic view of a light source apparatus in which a conventional short arc type discharge lamp and a concave reflection mirror are combined with each other.
Figure 5:
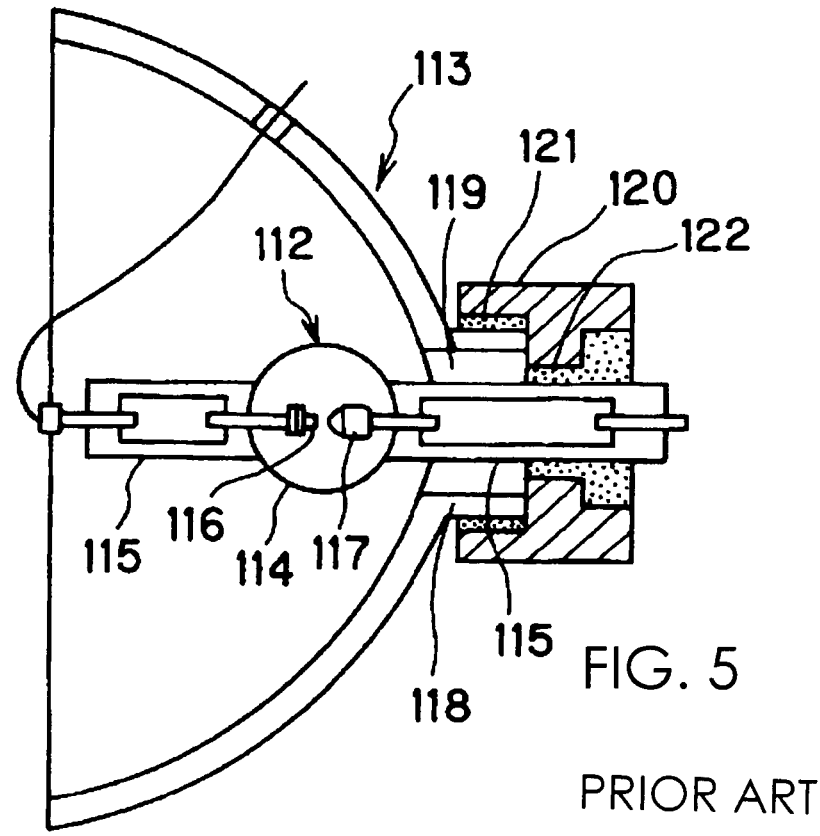
FIG. 5 is a schematic view of a light source apparatus in which a conventional short arc discharge lamp and a concave reflection mirror are combined with each other.

First of all, referring to FIGS. 2A to 2C, the fixing method in case of a short arc type discharge lamp in which a mouthpiece is not provided in the lamp sealing portions is explained.

Description of elements in these figures correspond to those shown in FIG. 1 is omitted, except for a cut surface 16 formed on the end portion of one of the sealing portions 4 of the short arc type discharge lamp 1.

First, as shown in FIG. 2A, the accuracy of the distance (L1) between the cut surface 16 provided on the end portion of the sealing portion 4 of the short arc type discharge lamp 1 and the tip of the anode 6 is secured, wherein usually, tolerance is 50 μm (micrometers) or less.

Moreover, decentration from the optical axis of the short arc type discharge lamp 1 is confined to 0.1 mm or less so as to secure the accuracy. Such secured accuracy may be required when the short arc type discharge lamp 1 is used for a liquid crystal projector, etc.

In addition, the cut surface 16 of the sealing portion is formed so as to have a predetermined accuracy by the grinder, as shown in FIG. 2B.

Next, as shown in FIG. 2C, one of the sealing portions 4 of the short arc type discharge lamp 1 is inserted in the head section 8 of the concave reflection mirror 2. The end portion of the short arc type discharge lamp 1 is received in the sealing portion receiving section 12 of the head section 8. The end surface formed on the end portion of the sealing portion 4 of the short arc type discharge lamp 1 and the inner bottom surface 10 of the sealing portion receiving section 12 are closely attached to each other. Under the present circumstances, adhesive is not filled in between the end portion of the sealing portion 4 of a short arc type discharge lamp 1, and the sealing portion receiving section 12 of the concave reflection mirror 2, but adhesive 13 is filled up in the inner concave portion of the head section 8 of the sealing portion receiving section 12 which is in the side of the electric discharge container 3, so that the short arc type discharge lamp 1 and the concave reflection mirror 2 are fixed to each other.

Next, referring to FIGS. 3A and 3B, the fixing method in case of the short arc discharge lamp having a metal mouthpiece in the sealing portion of the lamp is explained.

In these figure, the mouthpiece 17 is provided on one of the sealing portions 4 of the short arc type discharge lamp 1, wherein a projection portion for electric supply 18, an end surface 19 of the mouthpiece 17, a mouthpiece receiving portion 20 for receiving the mouthpiece 17, a nut 21, and an electric supply terminal 22 are provided. The other elements shown in these figures are the same as those shown in FIG. 2, so that description thereof is omitted.

First, as shown in FIG. 3A, the accuracy of the distance (L2) between the end surface 19 formed on the mouthpiece 17 of the sealing portion 4 and the tip of, for example, the anode 6 is secured. Usually, tolerance is 50 μm (micrometers) or less.

Moreover, decentration from the optical axis of the short arc type discharge lamp 1 is confined to less than 0.1 mm (millimeters) so as to secure the accuracy.

Next, as shown in FIG. 3B, one of the sealing portions 4 of the short arc type discharge lamp 1 is inserted in the head section 8 of the concave reflection mirror 2. The mouthpiece 17 of the short arc discharge lamp 1 is received by the head portion 8 of the mouthpiece receiving portion 20 and the end surface 19 of the mouthpiece 17 is brought into close contact with inner bottom surface 10 of the mouthpiece receiving portion 20. Under the present circumstances, adhesive is not filled in between the mouthpiece 17 of the sealing portion 4 of the short arc type discharge lamp 1 and the sealing portion receiving section 20 of the concave reflection mirror 2, but the short arc type discharge lamp 1 and the concave reflection mirror 2 are fixed by screwing them up with the electric supply terminal 22 by the nut 21.

In addition, although not illustrated, the short arc type discharge lamp 1 and the mouthpiece 17 are fixed by welding the external lead 7 exposed through the projection section 18 for electric supply which is projected from the mouthpiece 17 at the end portion of the projection section 18. A small amount of adhesive is filled up in the mouthpiece.

As mentioned above, in the present invention, it is important to secure the accuracy of position of the short arc type discharge lamp and the concave reflection mirror, but the premises for that purpose may be required as set forth below.

First, tolerance of size between the center of light (focal position) of the concave reflection mirror, and the sealing portion receiving section of the concave reflection mirror, or the inner bottom surface of the mouth piece receiving section is 50 μm (micrometer) or less.

Secondly, the accuracy of dimension between, for example, the tip of the electrode and the end surface of the sealing portion or the end surface of the mouthpiece is 50 μm or less in tolerance of size.

Lastly, a lamp having 0.1 mm or more decentration from the optical axis thereof is not used. Such premises can be satisfied on the accuracy level in a normal manufacturing process.

In the present invention, in order to increase the accuracy, adhesive is not used between the discharge lamp and the sealing portion receiving section or mouthpiece receiving section, thereby eliminating an factor making the accuracy uncertain due to adhesive filling.

In addition, in a direct current type discharge lamp according to the present invention, it is easy to improve the usability of light in the optical system using parallel light or in the optical system in which light is condensed, in view of optics, when the luminescent spot of a cathode is made into a focal position, and improvement of the accuracy of position is effective in order to increase illuminance.

Since such a direct current type discharge lamp, in view of optics has point light source like distribution in luminance distribution in the cathode side, the luminescent spot of the cathode can be effectively used so that it is effective to increase illuminance by improving the accuracy of the position.

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope.

The disclosure of Japanese Patent Application No. 2004-294114 filed on Oct. 6, 2005 including specification, drawings and claims is incorporated herein by reference in its entirety.

What is claimed is:

1. A light source apparatus comprising:
   a discharge lamp including:
   a discharge container;
   sealing portions continuously formed from both ends of the discharge container respectively; and a concave reflection mirror disposed so as to surround the discharge container, wherein the concave reflection mirror has a spheroidal surface or paraboloid of revolution formed from a front opening edge thereof, a cylindrical head section is provided in the concave reflection mirror and extends in an tube axis direction of the discharge lamp, a sealing portion receiving section is formed in the head section of the concave reflection mirror, in which an end of one of the sealing portions is received, the one of the sealing portions is received in the sealing portion receiving section so as not to project from an end of the sealing portion receiving section, the sealing portion receiving section has an internal surface whose diameter is approximately the same as an outer diameter of the one of the sealing portions, and an inner bottom surface, which is continuously formed from the internal surface, an end surface of an end portion of the one of the sealing portions and the inner bottom surface of the sealing portion receiving section are brought into close contact with each other, and an outer surface of the one of the sealing portion and the internal surface of the sealing portion receiving section are brought into close contact with each other, so that an emission center and an optical axis of the discharge lamp conform with a focal point and the optical axis of the concave reflection mirror.

2. The discharge lamp according to claim 1, wherein the discharge lamp is a direct current discharge lamp, and the sealing portion in an electrode side is contained in the sealing portion receiving section.

3. The lighting source apparatus according to claim 1, wherein tolerance of size between a focal position of the concave reflection mirror, and the sealing portion receiving section of the concave reflection mirror, or the inner bottom surface of a mouthpiece receiving section is 50 μm or less.

4. The light source apparatus according to claim 1, wherein accuracy of dimension between the tip of an electrode and an end surface of the sealing portion is 50 μm or less in tolerance of size 5. The light source apparatus according to claim 1, wherein the discharge container approximately spherical.

6. The discharge lamp according to claim 1, wherein the discharge lamp is a direct current discharge lamp, wherein the sealing portion in an electrode side is contained in the mouthpiece receiving section.

7. A light source apparatus comprising:
a discharge lamp including:
an approximately spherical discharge container;
sealing portions continuously formed from both ends of the discharge container respectively; and
a concave reflection mirror disposed so as to surround the discharge container,
wherein the concave reflection mirror has a spheroidal surface or paraboloid of revolution formed from a front opening edge thereof,
a cylindrical head section is provided in the concave reflection mirror and extends in an tube axis direction of the discharge lamp,
a mouthpiece receiving section is formed at the head section of the concave reflection mirror,
an end of a mouthpiece fixed to an end of one of the sealing portions is received by the mouthpiece receiving section so as not to project from an end of the mouthpiece receiving section;
the mouthpiece receiving section has an internal surface whose diameter is approximately the same as an outer diameter of the one of the sealing portions, and an inner bottom surface, which is continuously formed from the internal surface,
an end surface of the mouthpiece and the inner bottom surface of the mouthpiece receiving section are brought into close contact with each other, and an outer surface of the one of the sealing portion and the internal surface of the mouthpiece receiving section are brought into close contact with each other, so that an emission center and an optical axis of the discharge lamp conform with a focal point and the optical axis of the concave reflection mirror.

8. The light source apparatus according to claim 7, wherein tolerance of size between a focal position of the concave reflection mirror, and a sealing portion receiving section of the concave reflection mirror, or the inner bottom surface of the mouth piece receiving section is 50 μm or less.

9. The light source apparatus according to claim 7, wherein accuracy of dimension between the tip of an electrode and an end surface of the mouthpiece is 50 μm or less in tolerance of size.

10. The light source apparatus according to claim 7, wherein the discharge container approximately spherical.

11. A discharge lamp for a light source apparatus comprising:
a discharge container;
sealing portions formed from both ends of the discharge container respectively;
a concave reflection mirror disposed so as to surround the discharge container,
a sealing portion receiving section having an inner bottom surface and an internal surface, which is formed at a head section of the concave reflection mirror,
wherein the inner bottom surface extends in a direction perpendicular to an optical axis of the concave reflection mirror so as to define a position of the one of the sealing portion, in a direction of the optical axis of the concave reflection mirror,
wherein a diameter of the internal surface is approximately the same as an outer diameter of one of the sealing portions so as to define a position of the one of the sealing portion, in the direction perpendicular to the optical axis of the concave reflection mirror, and
wherein an end surface of an end portion of the one of the sealing portions is brought into close contact with the inner bottom surface of the sealing portion receiving section, and a side surface of the one of the sealing portion is brought into close contact with the internal surface the sealing portion receiving section.

* * * * *